United States Patent [19]
Brett

[11] Patent Number: 6,118,478
[45] Date of Patent: Sep. 12, 2000

[54] TELECINE SYSTEMS FOR HIGH DEFINITION USE

[75] Inventor: Stephen Brett, Sutton-at-Home, United Kingdom

[73] Assignee: Pandora International Limited, Northfleet, United Kingdom

[21] Appl. No.: 09/267,726

[22] Filed: Mar. 15, 1999

Related U.S. Application Data

[63] Continuation-in-part of application No. 08/838,183, Apr. 16, 1997, abandoned, which is a continuation of application No. 08/426,200, Apr. 21, 1995, abandoned.

[30] Foreign Application Priority Data

Apr. 21, 1994 [GB] United Kingdom .................. 9407904

[51] Int. Cl.[7] ...................................................... H04N 3/36
[52] U.S. Cl. ................................................. 348/97; 348/106
[58] Field of Search ............................... 348/96, 97, 105, 348/106, 112; H04N 3/36

[56] References Cited

U.S. PATENT DOCUMENTS

| | | |
|---|---|---|
| 4,393,410 | 7/1983 | Ridge et al. . |
| 4,468,693 | 8/1984 | Fujita et al. . |
| 4,485,408 | 11/1984 | Schumacher . |
| 4,797,942 | 1/1989 | Burt . |
| 4,903,141 | 2/1990 | Morton et al. . |
| 4,965,679 | 10/1990 | Morton et al. . |
| 5,281,995 | 1/1994 | Terashite et al. . |
| 5,386,228 | 1/1995 | Okino . |
| 5,528,290 | 6/1996 | Saund . |

FOREIGN PATENT DOCUMENTS

| | | |
|---|---|---|
| 2165417 | 4/1986 | United Kingdom . |
| 2243264 | 10/1991 | United Kingdom . |
| 2244626 | 12/1991 | United Kingdom . |
| 2256110 | 11/1992 | United Kingdom . |
| 2264606 | 9/1993 | United Kingdom . |
| 9320412 | 10/1993 | United Kingdom . |
| 2273412 | 6/1994 | United Kingdom . |
| 2283384 | 5/1995 | United Kingdom . |

OTHER PUBLICATIONS

Pratt, Digital Image Processing, Chp 5.4, published by Wiley Interscience, (1978).

*Primary Examiner*—Young Lee
*Attorney, Agent, or Firm*—McDonnell Boehnen Hulbert & Berghoff

[57] ABSTRACT

A method of using telecine apparatus to scan cinematographic film made up of individual image frames. Each frame is scanned a number of times using detected light to generate corresponding image data. Each sub-scanned portion within a frame adjoins another sub-scanned portion to enable reproduction of the complete frame by piecing-together data from the sub-scanned portions to produce data corresponding to the complete frame. To help ensure that no positional anomalies are present between adjoining sub-scans, a correlation step is carried out to identify a correlated alignment in position between data corresponding to adjoining subscans. The data from the subscans used in the correlation step is then adjusted to optimize spatial alignment between the data corresponding to the sub-scans. The correlation and adjustment of the subscan data sets may be repeated so that all of the sub-scans in a frame are optimally aligned in space, enabling the sub-scans to be combined into the complete image frame. In one embodiment, correlation is carried out during a first pass of cinematographic film through a telecine apparatus, while offset adjustments are carried out during a second pass (a rescan pass) of the cinematographic film through the telecine apparatus. In a further extension, the correlation and adjustment may additionally include optimizing and adjusting adjoining sub-scans in a frame for level correlation, such as optimizing brightness correlation between sub-scans.

10 Claims, 4 Drawing Sheets

TELECINE SYSTEMS FOR HIGH DEFINITION USE

CROSS REFERENCE TO RELATED APPLICATIONS

This application is a continuation in part of U.S. patent application Ser. No. 08/838,183 dated Apr. 16, 1997, now abandoned, which was itself a continuation of U.S. patent application Ser. No. 08/426,200 dated Apr. 21, 1995, also now abandoned.

TECHNICAL FIELD

This invention relates to telecine systems for high definition use in which motion picture film is transferred to video format or to a digital form.

In a typical telecine machine light passes through a frame of a film and beam splitting devices such as dichroic mirrors are used to split the light into the three colour components of red, green and blue which are then directed to respective photo-detecting devices. In a "flying spot" telecine machine a scanning cathode ray tube produces light which is used to scan successive frames of colour motion picture film. In a CCD telecine a light source such as a quartz halogen bulb is used and an array of CCD sensors is used.

With the advent of high definition television there is a need for telecine machines which can produce high definition video signals. A standard telecine machine such as Cintel's URSA™ machine may produce signals with a data flow of 18 million pixels per second for use with standard definition. To cope with high definition video this would have to be increased four times to 72 million pixels per second. This represents a considerable increase in technical complexity and expense. The present invention is concerned with telecine systems which can cope with high definition output without his problem.

BACKGROUND ART

U.K Patent 2,243,264B issued to Cintel discloses the use of a modified telecine machine to scan at high definition. The film is scanned in "Non Real Time", with each frame being scanned a number of times. Each partial scan for a frame covers only a portion of the pixels. The partial scans are then re-combined to produce data representing the entire frame, and output can then be provided at true film rate. In Cintel's Patent, each frame is considered as divided into a number of pixels suitable for high definition output. Each pixel will be one quarter of the size of normal definition pixels relative to the film and there will be four times as many of them per frame. The frame is then divided into a number of blocks, each containing four of the high definition pixels. A first scan is carried out, in which only one pixel in each block is analysed. The data is stored. The scan is then shifted and another pixel in each block is then analysed. This is repeated until each pixel in each block has been analysed. In practice therefore using a block consisting of two pixels on one scanning line and two on the next scanning line, there will be four interleaved partial scans, one covering odd lines and odd pixels, one odd lines and even pixels, one even lines and odd pixels and finally even lines and even pixels. The information from the four partial scans is then recombined to provide data representing the entire frame, and this data is then stored in a frame store for subsequent output. In this manner, a telecine machine which has been designed essentially for normal definition output can be modified to produce high definition output.

In my co-pending U.S. patent application Ser. No. 08/317,329 entitled "High Definition Colour Correction" filed on Oct. 4, 1994 I disclose a system for colour correcting images in such high definition systems. In addition to the possibility of interleaved scanning as disclosed in Cintel. I also refer to the possibility of dividing the frame into four quadrants which are scanned separately, such as top left, top right, bottom left and bottom right.

In the above systems, it is assumed that there is no problem in re-constituting the image of the entire frame from the partial scans. For example, in Cintel the system knows that the successive partial scans have been shifted by one pixel horizontally and/or vertically and it is this displacement that will be assumed when the complete image is re-constituted. However, I have now realised that there can be inaccuracies in this assumption. The nature of the above systems is that each partial scan takes the same time as a complete scan at normal resolution. To completely scan a frame with the four successive partial scans will take four times as long as scanning a frame once at normal resolution. In this extended period, errors may occur which will affect undesirably the spatial alignment of the successive partial scans.

In a flying spot system, for example, one source of errors will be possible fluctuations in the background magnetic field between the successive partial scans. Such changes in background magnetic field will affect the deflection of the electron beam with the cathode ray tube and thus the position of the light spot formed on the phosphorised face of the tube. The resultant deviation of the beam of light passing to the film frame for one partial scan as compared to another partial scan will mean that positional and rotational discrepancies and discontinuities may occur when the partial scans are combined to re-constitute the complete frame. This is extremely undesirable.

Re-constituting partial images has been proposed in another field. In U.S. Pat. No. 5,386,228 dated Jan. 31, 1995, issued to Tadashi Okino, there is disclosed an image pickup device used, for example, in a home video camera. Okino addresses the problem of physically fitting together image pickup elements such as CCD's in sufficient density for higher resolution use. In Okino, this particular physical problem is solved by scanning the complete image in one pass, but then splitting the transmitted light into portions which are directed simultaneously to different arrays of pickup elements. Each of these arrays is arranged physically only to receive light from a particular part of the image. In one preferred arrangement in Okino, the light from a scan is passed simultaneously to four separate arrays, each arranged physically to respond to light form a different quadrant of the image. Because there is a single scan and the light for the four quadrants is analysed simultaneously, there is no problem with errors occurring between partial scans and Okino does not consider the manner in which the image portions from the four arrays are re-combined in spatial alignment. Okino deals with the problem that the differences in optical paths and pickup sensitivities for the four different quadrants may lead to undesirable differences in intensities, and deals with this by overlapping the quadrants and analysing the intensities in the overlapping regions. Such a problem does not arise in the telecine systems described earlier, because the partial scans are carried out sequentially and the light in each follows the same optical path to the same sensors.

The simultaneous handling of quadrants as in Okino is inappropriate for the telecine systems described earlier. Not only would the additional hardware make the apparatus extremely complicated, but there would be the problem of having to scan at high resolution rates and to handle a real time data stream comprising simultaneous data for the entire image at high resolution.

There thus remains as a need for a telecine system in which there can be carried out successive partial scans at normal resolution, followed by re-constitution of the entire image at high resolution, but without the problems arising from discrepancies arising during the period over which the successive scans are carried out.

SUMMARY OF THE INVENTION

An object of the present invention is to provide a method of using telecine apparatus to carry out high definition scanning of cinematographic film by carrying out successive partial scans of film frames at normal resolution and combining the partial scans to form a scan of the complete frame, without the problems of prior art systems.

According to the invention, there is provided a method of using telecine apparatus to scan cinematographic film which comprises a plurality of individual image frames, in which method each individual image frame is scanned a plurality of times in sequence using light which is detected to generate data corresponding to the image frame. The method includes the steps of a) for each image frame carrying out in sequence, one after the other, a plurality of sub-scans, each sub-scan being in respect of a different portion of the image frame, and each sub-scanned portion adjoining another sub-scanned portion so that data corresponding to the sub scanned portions can be combined to produce data corresponding to the complete image frame; b) in respect of data corresponding to a first sub-scanned portion of an image frame, identifying a first data set representing a region where the first sub-scanned portion adjoins a second sub-scanned portion of said image frame; c) in respect of data corresponding to said second sub-scanned portion, identifying a second data set representing a region where said second sub-scanned portion adjoins said first sub-scanned portion; d) carrying out a correlation step in respect of the first and second data sets; e) carrying out an adjustment step on the data corresponding to at least one of said first and second sub-scanned portions, in accordance with the results of the correlation step, so as to optimise spatial alignment between the data corresponding to said first sub-scanned portion and the data corresponding to the second sub-scanned portion; f) where necessary, repeating the identifying, correlation and adjustment steps so as to optimise the spatial alignment of the data corresponding to all of the sub-scanned portions; and g) combining the adjusted data corresponding to the sub-scanned portions so as to produce data corresponding to the complete image frame.

In accordance with the present invention, therefore, a region containing image data from two or more adjacent image portions is analysed and a correlation function calculated. The relative spatial alignment of the portions are altered, and the degree of correlation is monitored. The relative spacial alignment of the image portions is adjusted until there is optimum correlation, and this will therefore mean that there is optimum spatial alignment between the scans.

If the region which is analysed contains overlapping parts of the two image portions, then it should in theory be possible to achieve virtually complete correlation and thus complete spatial alignment. In an exemplary embodiment of the present invention in which the original image is scanned in four portions, it is advantageous to overlap the portions so that correlation will be carried out in respect of the overlapping regions. However, it is also possible to use a system in which there is no overlap, and instead correlation is carried out over an area which covers the join between two portions and regions adjacent the join. In a system which uses interleaved scanning, it is possible to carry out a correlation technique on any area of the complete image which contains a few lines of pixels, since this will invariably contain pixels scanned in one of the passes, and pixels scanned in a subsequent pass. Whilst perfect correlation can only be obtained by means of overlapping image portions, the above described alternatives will give acceptable results because in practice, in a typical image there are not very substantial changes from one pixel to the next and changes tend to take place over the space of a few pixels. Although absolute correlation may not be achieved, a sufficient degree can be obtained to improve the spatial alignment of the image portions.

Correlation may be effected by the use of mathematical correlation techniques such as taught in Pratt (Digital Image Processing, published by Wiley Interscience, ISBN 0-471-01888-0). It is possible to obtain an 'autocorrelation fiction' for either the whole image or part of the image. For an interlacing method, one can take a small, roughly square, region of any of the picture for this purpose. For the quadrant technique it is necessary to take one or more small areas of picture where it is known that there are pixels from more than one scan, ie. a region over the join between quadrants. The correlation process then involves offsetting the alignment between scans, by 'scrolling' one of the scans relative to another, by an arbitrary amount. The autocorrelation function can then be recalculated. An increase in the function indicates that the extent of scroll has made things worse. The size of scrolled offset to try can be controlled by the change in autocorrelation function.

A further problem with reconstituting the constituent portions of an image is that apart from positional anomalies there may be other anomalies. Commercially available telecine machines are subject to a number of variations with time, and between the scans of the constituent frame portions there may be a change in the gain of the telecine or the "offset" (black level). This can cause unacceptable effects in the final image. Where four quadrants are combined there may be level variations from one region of the image to the other. Where interleaved scans are used, an undesirable pattern may appear due to variations in level every two lines and every two pixels. In a further development of the invention, therefore, the constituent sub-scans are not just fitted together in the geometrical sense but adjustments are also made to compensate for changes in the level, i.c brightness, between the scans. One way of doing this would be to carry out the autocorrelation technique for spatial alignment as described earlier, and then whilst keeping the position fixed to scale the pixel values by values around unity in one of the image parts to seek even higher correlation values. Another method could be to scale the constituent parts before carrying out spatial alignment.

Other objects and advantages of the present invention will become apparent from the following description of preferred embodiments taken in conjunction with the accompanying drawings.

DETAILED DESCRIPTION OF THE PREFERRED EMBODIMENTS

Figure 1:
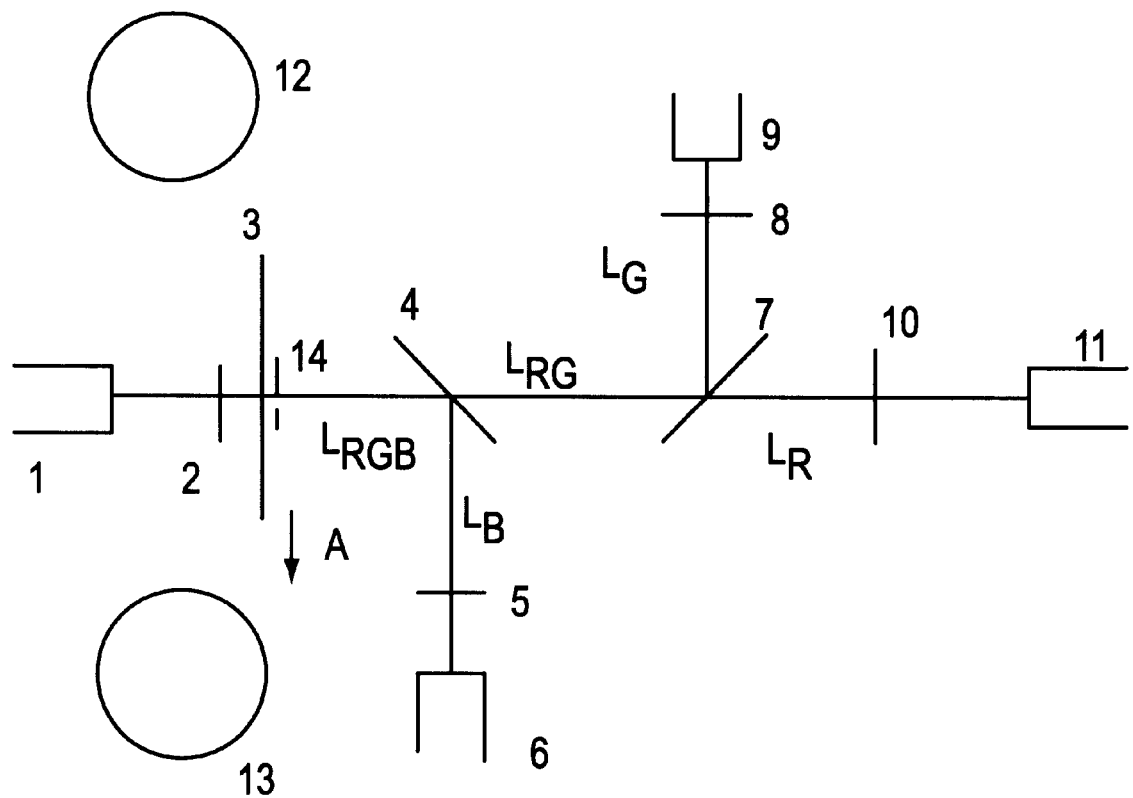
FIG. 1 is a diagrammatic representation of a telecine machine which is used in carrying out the embodiments of the present invention.

FIG. 1 illustrates in diagrammatic form a typical telecine apparatus of the type known in the art, to which the present invention can be applied. The apparatus comprises a source of light 1 such as a scanning cathode ray tube which produces a spot of light forming a narrow beam of light L. This passes through a lens 2 and then through a frame of a cinematographic film 3 in the region of a gate 14. The film is moved from reel 12 to reel 13 and individual frames on the film are scanned in sequence. The light which passes through the film is indicated by $L_{RGB}$. This then passes to a dichroic mirror 4, which reflects blue light along the path indicated by $L_B$. The red and green light continues through as indicated by $L_{RG}$ until it meets a second dichroic mirror 7. At this the green light is reflected along the path indicated by $L_G$ whilst the red light continues through as indicated by $L_R$.

The blue light $L_B$ passes through an imaging lens 5 and then on to a photo-detecting device 6, the green light $L_G$ through an imaging lens 8 and on to a photo-detecting device 9, and the red light $L_R$ through an imaging lens 10 and on to a photo-detecting device 11. Thus, during scanning of a film frame by the light source 1, when the narrow beam $L_{RGB}$ passes through a particular point on the frame, information is recorded simultaneously by the three photo-detecting devices 6, 9 and 11, and this enables data to be generated and stored concerning the image parameters at that point.

In the operation of such telecine apparatus in a conventional manner at normal definition, each frame of the film is scanned once only and data concerning the entire image in the frame is generated during this single scan. However, in accordance with the present invention each frame is scanned a number of times in succession. Each scan covers only part of the entire image in the frame, and the individual parts are stored and then joined together to re-constitute the entire image. This enables the frame to be scanned at high definition even though the telecine apparatus was originally intended for normal definition use.

Figures 2, 3:
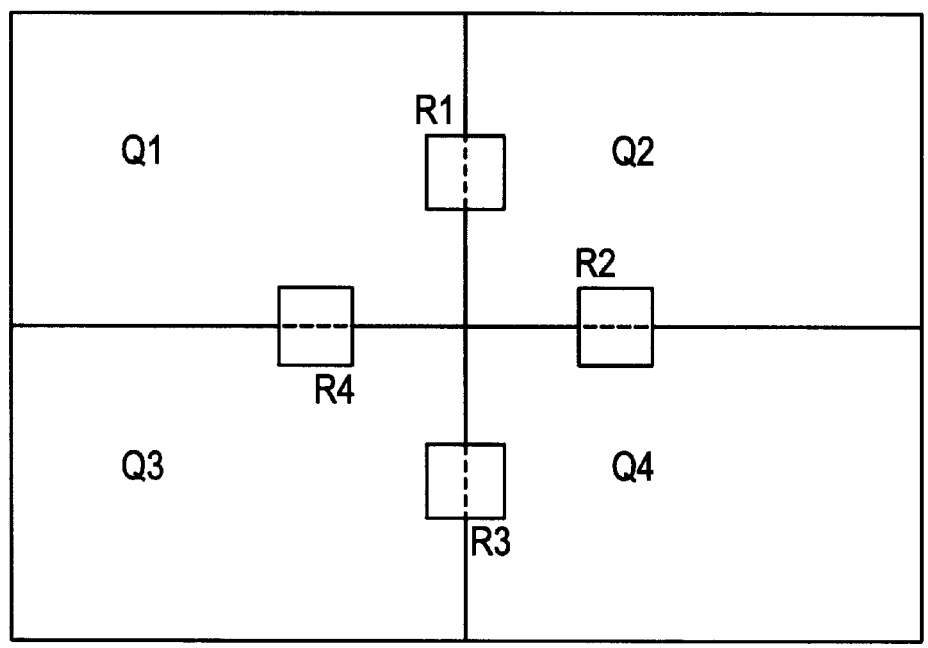
FIG. 2 is a diagram exemplifying the scanning sequence used in carrying out one embodiment of the present invention with interleaved partial scans.
FIG. 3 is a diagram exemplifying the scanning sequence used in carrying out a second embodiment of the present invention, with abutting quadrant scans.

FIG. 2 illustrates diagrammatically how a set of four interleaved scans may be carried out. In the figure, there is shown an image frame which has been divided into 144 high resolution pixels, some of which have been numbered for ease of identification. For scanning purposes these can then be considered as grouped together in blocks of four pixels. There is shown by way of example a block of four pixels E1, F1, E2, F2, and another block M3, N3, M4, N4. In each of four subscans, one pixel in each block of four pixels is scanned. In a first subscan it might be odd lines and odd pixels, then odd lines and even pixels, followed by even lines and odd pixels and finally even lines and even pixels. Thus, the first subscan would encompass 36 pixels in this example, including E1 and M3. The three subsequent subscans would include F1/N3; E2/M4; and F2/N4. In such an arrangement it is easy to identify a larger region for correlation purposes which includes pixels from each of the four scans such as a region defined by the pixels A1, H1, A4, H4.

Figure 4:
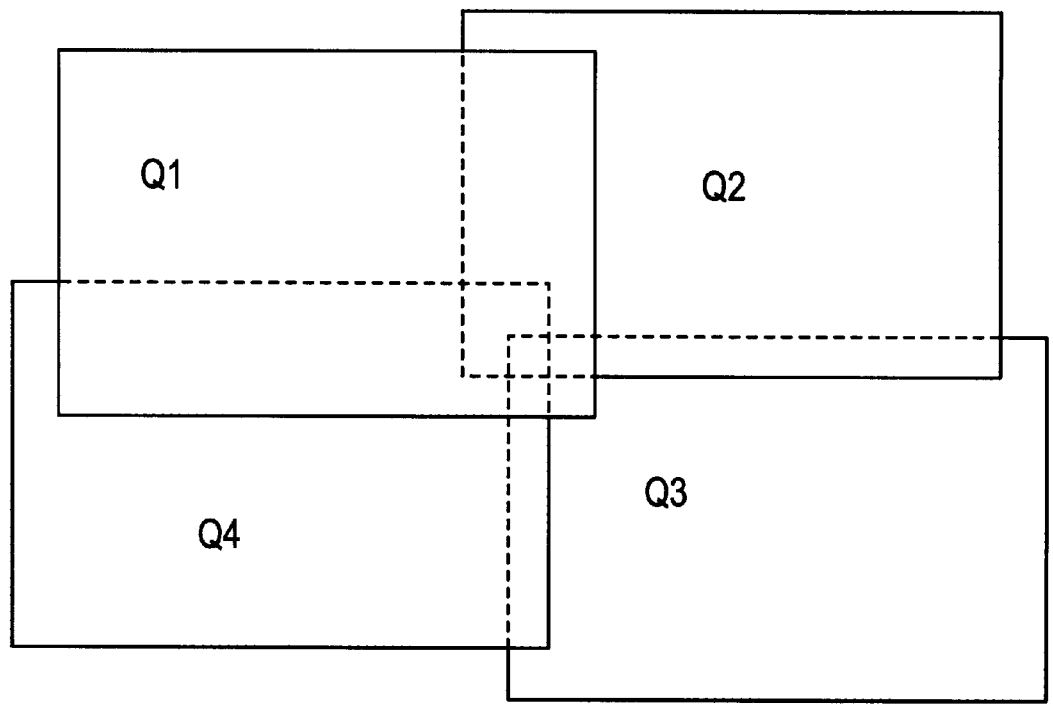
FIG. 4 is a diagram exemplifying the scanning sequence used in carrying out a third embodiment of the present invention, with overlapping quadrant scans.

FIG. 3 shows diagrammatically how an entire image frame may be split into four abutting quadrants Q1, Q2, Q3, Q4. Each of these quadrants would be covered entirely in sequence by successive subscans. To effect correlation, regions in the regions of the joins will be identified and analysed, such as regions indicated diagrammatically at R1, R2, R3 and R4. FIG. 4 shows how four overlapping subscans Q1, Q2, Q3 and Q4 may be used, in which case correlation can be carried out in respect of the overlapping regions.

It is necessary to decide what to fit to what. In a the quadrant system as shown in FIG. 3, one could move the top right hand quarter Q2 relative to the top left hand quarter Q1 by looking at a region R1 of the join between the two, optimise this offset; then fit the bottom left hand quarter Q3 to these quarters by looking at a region R4; and then finally move the bottom right hand quarter Q4 by looking at a region R3 to finally optimise the whole picture. In such an arrangement, use of region R2 would be redundant but could be implemented as a check.

In a typical image there are not very substantial changes from one pixel to the next and changes tend to take place over the space of a few pixels. Accordingly, there should be a fairly high degree of correlation between directly adjacent areas which are scanned. In the method of FIG. 4 there is an overlap between each adjacent quarter. If there is then carried out a correlation technique in respect of an overlapped region there should be absolute correlation if the alignment is perfect. Effectively, one could scroll one quarter over the other until the two are identical in the overlapping region.

Figure 6:
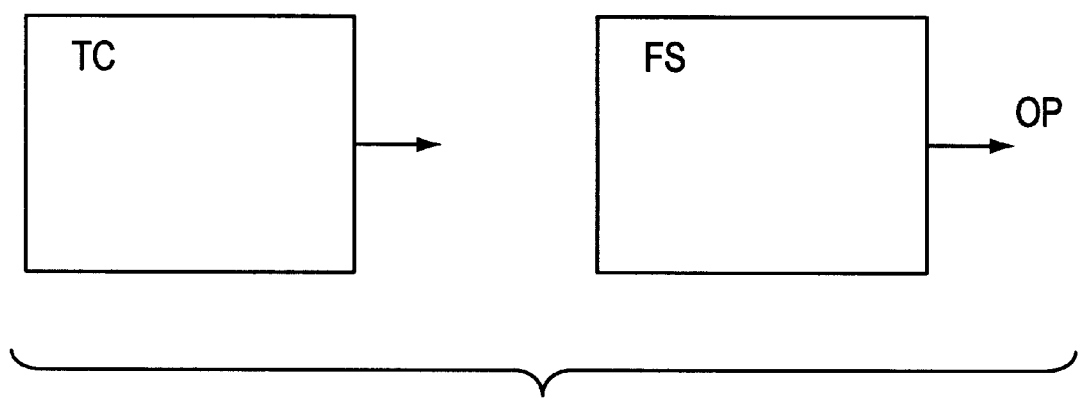
FIG. 6 is a diagram showing the steps taken to create the complete image.

As indicated in FIG. 6, the data from the four subscans carried out by the telecine machine TC is transferred to a frame store FS, where the subscans of each frame are assembled to create an image, correlation be carried out to avoid discrepancies and discontinuities. A number of complete frames are stored, before being output at OP.

There are now available a number of powerful computers, such as the 'ONYX 2'™ from Silicon Graphics Inc. Computers of this sort have enormous amounts of memory and disc store, and can produce composite pictures from several small or part elements. Such a computer may be used as the multi-frame store FS. Calculating the autocorrelation function may be carried out in the computer. Alternatively it could be calculated using currently available dedicated microprocessors, such as the TRW 2220/2221 series of chips available from Raytheon Semiconductor. The address 'scrolling' can be accomplished by using the TRW series TMC2302 chips also available from Raytheon Semiconductor. Such chips could either be used as an 'add on' processor to the 'ONYX 2' computer, or as the basis for a custom total hardware solution of frame store and TRW chips.

A computer may be connected directly to the telecine apparatus, or the image communication between the telecine and the supercomputer could be accomplished via a video tape (such as 'D1' format), or via a 'data' tape format, such as Exabyte™ or Ampex DST™.

As well as moving the alignment in (x, y), the errors discussed above may also manifest themselves in rotational errors. Such autocorrelation techniques can also be applied in a rotational manner, although the processing power necessary to 'rotate' a picture section is much greater. Such processing power may come from 'supercomputers' with enormous processing power, quite often having eight or more CPUs. Further 'higher order' errors, or for example a trapezoidal error may also be taken out by similar methods if desired.

Further implementations of such a system could be with the telecine apparatus being used to re-scan the 'quarters' or 'interlaced' scans instead of using powerful processing means to recalculate them. Particularly for higher order transformations (trapezoidal or rotational) corrections this becomes more advantageous, although it obviously ties up use of the telecine apparatus for longer.

In one arrangement there may be two discrete telecine passes. The first is where the transfer takes place to the best accuracy possible on the telecine, and the supercomputer works out the optimum correction in x, y, theta (angle) and trapezoidal, or even 'warp' parameters. It is important to realise that to do this it is only necessary to look at small representative areas of the picture. One may then come up with a 'rescan file' containing instructions, which when interpreted by the telecine programmer (for example the POGLE™ from Pandora International Ltd. of Northfleet, Kent, England) will cause the rescanning of the constituent elements to get optimal 'fit' between the subscans. The advantage of this method is that the telecine is only required for two discrete phases. Thus, the telecine feed quarter or part images to the supercomputer, under programmer control. The result of autocorrelation in the supercomputer results in a rescan file which the programmer, such as the POGLE, can use to rescan the quarters with new offets to compensate for errors.

It is important to realise that all of the above techniques apply not only for the construction of High Definition pictures (typically 1000 lines or so) but also to construct so called 'film resolution' images (typically up to 4000 lines) either from standard definition scans (typically 500–600 lines) or High definition scans (typically 1000 lines or so).

Dealing now in more detail with the concept of correlation, it can be described in terms of a mathematical function as in equation 5.4-3 of page 129 of Pratt (Digital Image Processing, published by Wiley Interscience, ISBN 0-471-01888-0).

Figure 5:
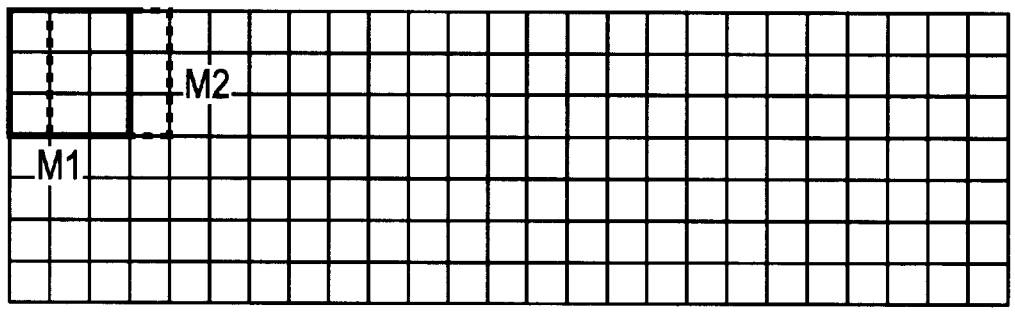
FIG. 5 is a diagram explaining how a correlation technique may be carried out.

Assessing correlation usually involves 'convolution'. Convolution can be thought of as sliding one small window over another larger window, and in each discrete position assessing a mathematical formula. A good example of 2-D Convolution is the application of a 3×3 'Laplacian' window to an image to either 'sharpen' or 'blur' an image. In this case, as shown in FIG. 5, one places a three by three 'mast' M1 in the top left band corner of the image, and performs an operation on each of the nine coefficients of the mask on the image. In the case of FIG. 5. one multiplies each of the nine mask coefficients with the corresponding image coefficient that it lies on top of. One then sums the nine multiplied sets of data, and replaces the centre element of the image with this new value. One then 'scrolls' the small mask one element to the right, to M2, and repeats the process. When the edge of the mask reaches the right hand side of the image, one starts again on the next lower line of the image. This description ignores any special 'boundary' conditions. The above process is described as 'convolving' the mask with the image. In the case described with reference to FIG. 5, a typical sharpening mask would be:

$$\begin{matrix} 0 & -1 & 0 \\ -1 & 5 & -1 \\ 0 & -1 & 0 \end{matrix}$$

To assess correlation one 'scrolls' a part of an image over another, and in each position assesses a mathematical function to determine the 'fit' of the one image to the other. This function could be mathematically one of many. A typical example would be the number one, divided by the sums of the squares of the differences between the value of the 'top' window and the 'lower' window beneath it. This would give a value of infinity for a perfect match, and a very small value for two totally different images.

What is claimed is:

1. A method of using telecine apparatus to scan cinematographic film which comprises a plurality of individual image frames, in which method each individual image frame is scanned a plurality of times in sequence using light which is detected to generate data corresponding to the image frame, the method including the steps of:
  a) for each image frame carrying out in sequence, one after the other, a plurality of sub-scans, each sub-scan being in respect of a different portion of the image frame, and each sub-scanned portion adjoining another sub-scanned portion so that data corresponding to the sub-scanned portions can be combined to produce data corresponding to a complete image frame;
  b) in respect of data corresponding to a first sub-scanned portion of an image frame, identifying a first data set representing a region where the first sub-scanned portion adjoins a second sub-scanned portion of said image frame;
  c) in respect of data corresponding to said second sub-scanned portion, identifying a second data set representing a region where said second sub-scanned portion adjoins said first sub-scanned portion;
  d) carrying out a correlation step in respect of the first and second data sets, whereby the correlation step identifies a correlated alignment in position between the first and second sub-scanned portions;
  e) carrying out an adjustment step on the data corresponding to at least one of said first and second sub-scanned portions, in accordance with the results of the correlation step, so as to optimize positional alignment between the data corresponding to said first sub-scanned portion and the data corresponding to the second sub-scanned portion, whereby the adjustment step results in at least one of the first and second data sets being modified to obtain the correlated alignment in position between the first and second sub-scanned portions to produce adjusted data;
  f) repeating at least one the identifying, correlation and adjustment steps so as to optimize the spatial alignment of the data corresponding to all of the sub-scanned portions; and
  g) combining the adjusted data corresponding to the sub-scanned portions so as to produce data corresponding to the complete image frame.

2. A method as claimed in claim 1, wherein the sub-scans are in the form of interleaved partial scans across the image frame.

3. A method as claimed in claim 1, wherein the sub-scanned portions are different segments of the image frame.

4. A method as claimed in claim 3, wherein adjoining segments overlap and the region of the first sub-scanned portion and the region of the second sub-scanned portion are located where the segments overlap.

5. A method as claimed in claim 3, wherein adjoining segments abut and the region of the first sub-scanned portion and the region of the second sub-scanned portion are located adjacent where the segments abut.

6. A method as claimed in claim 1, wherein the adjustment step is carried out by processing means which operates on image data.

7. A method as claimed in claim 1, wherein the adjustment step is carried by means of re-scanning the image frame using the telecine apparatus.

8. A method as claimed in claim 1, wherein steps are carried out to optimize level correlation between the data corresponding to said first sub-scanned portion and the data corresponding to the second sub-scanned portion.

9. A method of using telecine apparatus to scan cinematographic film which comprises a plurality of image frames, in which each image frame of the cinematographic film is scanned by a light beam from a cathode ray tube which is detected to generate data corresponding to the image frame, the method including the steps of:

a) for each image frame carrying out in sequence, one after the other, a plurality of separate sub-scans, each sub-scan being in respect of a different portion of the image frame, and each sub-scanned portion adjoining another sub-scanned portion so that data corresponding to the sub-scanned portions can be combined to produce data corresponding to a complete image frame;

b) carrying out repeated correlation and adjustment steps in respect of data from the sub-scans to optimize positional alignment between the sub-scans to compensate for variations in background magnetic field which occur in the period between the separate sub-scans and affect the position of the cathode ray tube beam, whereby the repeated correlation and adjustment steps result in the data from the sub-scans being modified to obtain a correlated alignment in position between the sub-scanned portions to produce adjusted data; and c) combining the adjusted data from the sub-scans so as to produce data corresponding to the complete image frame.

10. A method of using telecine apparatus to scan cinematographic film which comprises a plurality of image frames, in which each image frame of the cinematographic film is scanned using light which is detected to generate data corresponding to the image frame, the method including the steps of:

a) in a first pass of the cinematographic film through the telecine apparatus, for each image frame carrying out in sequence, one after the other, a plurality of separate sub-scans, each sub-scan being in respect of a different portion of the image frame, and each sub-scanned portion adjoining another sub-scanned portion so that data corresponding to the sub-scanned portions can be combined to produce data corresponding to a complete image frame;

b) carrying out correlation steps in respect of data from the sub-scans to produce rescan instructions to optimize spatial alignment between the sub-scans, whereby the correlation steps identify a correlated alignment in position between the sub-scans for each frame;

c) in a second pass of the cinematographic film through the telecine apparatus repeating the sub-scans for each frame but with offsets in accordance with the rescan instructions to optimize positional alignment between the sub-scans for each image frame, whereby the offsets produce the correlated alignment in position between the sub-scans for each frame, as identified in the correlation steps; and d) for each image frame combining the data from the sub-scans in the second pass of the film through the telecine apparatus so as to produce data corresponding to the complete image frame.

* * * * *